United States Patent
Yuasa

(10) Patent No.: US 9,753,821 B2
(45) Date of Patent: Sep. 5, 2017

(54) POWER SUPPLY CONTROL DEVICE AND POWER SUPPLY DEVICE

(71) Applicant: FUJITSU LIMITED, Kawasaki-shi, Kanagawa (JP)

(72) Inventor: Kentarou Yuasa, Chofu (JP)

(73) Assignee: FUJITSU LIMITED, Kawasaki (JP)

( * ) Notice: Subject to any disclaimer, the term of this patent is extended or adjusted under 35 U.S.C. 154(b) by 29 days.

(21) Appl. No.: 14/749,034

(22) Filed: Jun. 24, 2015

(65) Prior Publication Data
US 2016/0041602 A1 Feb. 11, 2016

(30) Foreign Application Priority Data
Aug. 8, 2014 (JP) .................. 2014-162076

(51) Int. Cl.
G06F 11/00 (2006.01)
G06F 11/20 (2006.01)
G06F 1/30 (2006.01)

(52) U.S. Cl.
CPC .......... G06F 11/2015 (2013.01); G06F 1/305 (2013.01)

(58) Field of Classification Search
CPC ........ G06F 11/2015; G06F 1/28–1/305; G06F 11/2005
See application file for complete search history.

(56) References Cited

U.S. PATENT DOCUMENTS

| 5,784,629 A | * | 7/1998 | Anderson | G06F 1/30 365/226 |
| 6,735,704 B1 | * | 5/2004 | Butka | H02J 1/10 307/86 |
| 6,815,843 B1 | | 11/2004 | Kageyama | |
| 7,363,520 B1 | * | 4/2008 | Maier, Jr. | G06F 1/26 713/300 |
| 2010/0093223 A1 | * | 4/2010 | Pappas | G06F 1/263 439/660 |

FOREIGN PATENT DOCUMENTS

| JP | 2001-178134 | 6/2001 |
| JP | 2003-79069 | 3/2003 |
| JP | 2008-5565 | 1/2008 |

* cited by examiner

*Primary Examiner* — Jason Bryan
(74) *Attorney, Agent, or Firm* — Staas & Halsey LLP

(57) ABSTRACT

A power supply control device for a system having two or more power supply devices, configured to control a first power supply device that includes a compensation device configured to perform power compensation at a time of power failure, the power supply control device includes a controller configured to limit the power compensation of the compensation device in a normal state, and release the limitation on the power compensation of the compensation device if detecting power failure of the first power supply device and detecting power failure of a second power supply device provided redundantly in addition to the first power supply device.

8 Claims, 9 Drawing Sheets

POWER SUPPLY CONTROL DEVICE AND POWER SUPPLY DEVICE

CROSS-REFERENCE TO RELATED APPLICATION

This application is based upon and claims the benefit of priority of the prior Japanese Patent Application No. 2014-162076, filed on Aug. 8, 2014, the entire contents of which are incorporated herein by reference.

FIELD

The embodiments discussed herein are related to a power supply control device and a power supply device.

BACKGROUND

Some of the countries and regions exhibiting remarkable economic growth are in an unstable electricity environment, where power failure and instantaneous voltage drop often occur, because infrastructure development fails to catch up with the scale of its economic growth. In addition, recent large-scale introduction of natural energy may result in an unstable electricity environment even in regions having an already-developed electricity environment.

Meanwhile, in a data center, many IT devices are installed together, and accordingly power consumption and installation area of the devices have been increasing. For this reason, with an increasing demand for the power saving and downsizing of each device, a power supply unit has been requested to achieve improvement in power efficiency and enhancement in power density.

However, one of factors hindering the enhancement in the power density of the power supply unit is the instantaneous voltage drop described above. The instantaneous voltage drop stops power supply for a period of several milliseconds (ms) to several seconds (s). A power supply device is equipped with a compensation capacitor so that the operation of each IT device would not be stopped even in the event of the instantaneous voltage drop. The compensation capacitor accumulates energy in a normal state, and feeds the energy at the occurrence of the instantaneous voltage drop to keep the IT device running.

The above-described techniques are disclosed, for example, in Japanese Laid-open Patent Publications Nos. 2003-79069, 2008-5565, and 2001-178134.

However, in order to meet a request to have high reliability, the power supply device has to have a large-capacity compensation capacitor. Such a large-capacity compensation capacitor occupies a large area for installation inside the power supply device (about 20%, for example), which increases the size of the power supply device.

An aspect of the embodiments aims to provide a power supply control device and a power supply device which enable compensation for long-time instantaneous voltage drop with the downsized power supply device.

SUMMARY

According to an aspect of the invention, a power supply control device for a system having two or more power supply devices, configured to control a first power supply device that includes a compensation device configured to perform power compensation at a time of power failure, the power supply control device includes a controller configured to limit the power compensation of the compensation device in a normal state, and release the limitation on the power compensation of the compensation device if detecting power failure of the first power supply device and detecting power failure of a second power supply device provided redundantly in addition to the first power supply device.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

Hereinafter, embodiments are described in detail with reference to the drawings.

[First Embodiment]

Figure 1:
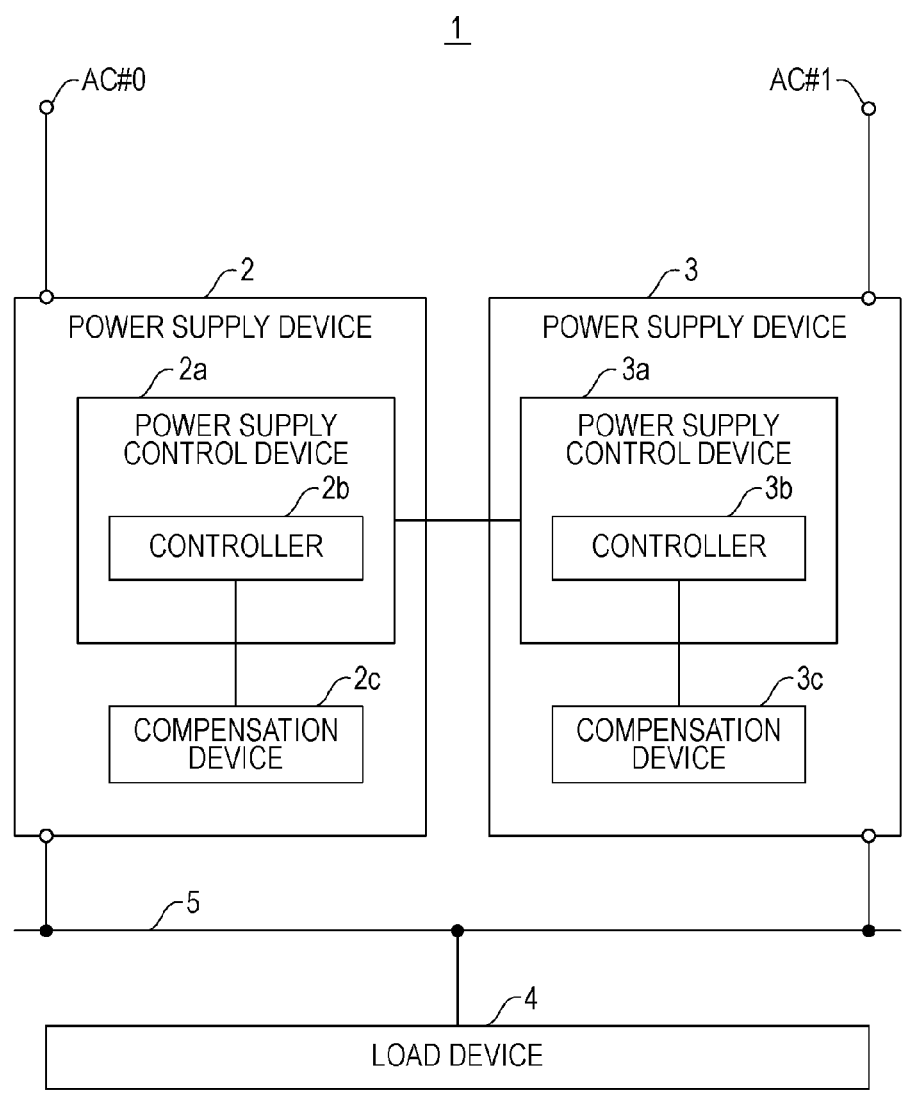
FIG. 1 is a diagram illustrating an example of a power supply system according to a first embodiment.

First, a power supply system according to a first embodiment is described using FIG. 1. FIG. 1 is a diagram illustrating an example of the power supply system according to the first embodiment.

A power supply system 1 is configured to supply redundant electric power provided by dual power supply devices 2, 3 to a load device 4 via a power supply line 5. The power supply device 2 is configured to output a direct-current (DC) power source of a predetermined voltage in response to an input of an alternating-current (AC) power source AC#0. The power supply device 3 is configured to output a DC power source of a predetermined voltage in response to an input of an AC power source AC#1. The power supply device 2 and the power supply device 3 are connected to each other so as to be capable of mutually exchanging signals generated along with detection of power failure of the power supply devices 2, 3. Note that such power failure includes instantaneous voltage drop and instantaneous voltage interruption for a period of several milliseconds (ms) to several seconds (s).

The power supply device 2 includes a power supply control device 2a and a compensation device 2c. The power supply control device 2a is configured to control the power supply device 2. The power supply control device 2a includes a controller 2b. The compensation device 2c is configured to perform power compensation at the time of power failure of the AC power source AC#0. Examples of the compensation device 2c include a secondary battery and other electricity storage devices.

The power supply device 3 has the same configuration as the power supply device 2, and includes a power supply control device 3a and a compensation device 3c. The power supply control device 3a is configured to control the power supply device 3. The power supply control device 3a includes a controller 3b. The compensation device 3c is configured to perform power compensation at the time of power failure of the AC power source AC#1. Examples of the compensation device 3c include a secondary battery and other electricity storage devices.

The controller 2b is configured to limit the power compensation of the compensation device 2c in a normal state. For example, the power supply device 2 includes a limitation unit (not illustrated) configured to limit the power compensation of the compensation device 2c, and the controller 2b limits the power compensation of the compensation device 2c by inputting a limitation signal to the limitation unit. Note that the normal state indicates a state where the power supply device 2 outputs a DC power source of the predetermined voltage in response to an input of the AC power source AC#0.

The controller 2b is also configured to release the limit on the power compensation of the compensation device 2c if detecting power failure of the power supply device 2 and power failure of the power supply device 3 provided redundantly in addition to the power supply device 2. For example, the controller 2b monitors an output voltage of the power supply device 2 to detect power failure of the power supply device 2. The controller 2b also detects power failure of the power supply device 3 by receiving, from the power supply device 3 (including the power supply control device 3a), a signal (release signal) generated along with detection of the power failure of the power supply device 3. The controller 2b releases the limit on the power compensation of the compensation device 2c by inputting, to the limitation unit, a release signal generated along with the detection of the power failure of the power supply device 2 and the release signal generated along with the detection of the power failure of the power supply device 3.

In this way, the limit on the power compensation of the compensation device 2c is not released immediately upon the detection of the power failure of the power supply device 2, but released when both the power supply device 2 and the power supply device 3 are in the power failure state.

Thereby, even when the power failure of the power supply device 2 has been detected, the compensation device 2c may perform power compensation only after the power failure of the power supply device 3 is detected. Besides, if the controller 3b controls the compensation device 3c as in the case of the controller 2b, the limit on the power compensation of the compensation device 2c and the compensation device 3c may be released at the same timing.

Accordingly, because the compensation device 2c and the compensation device 3c perform power compensation in cooperation with each other, the power supply system 1 may compensate instantaneous voltage drop for a longer period than a period for which each compensation device may compensate instantaneous voltage drop. Such power supply devices 2, 3 make it possible to reduce the amount of energy to be accumulated in each of the compensation devices 2c, 3c, thereby to downsize the compensation devices 2c, 3c, that is, downsize the power supply devices 2, 3.

Thus, the power supply system 1 may compensate instantaneous voltage drop for a long period with the downsized power supply devices 2, 3.

[Second Embodiment]

Figure 2:
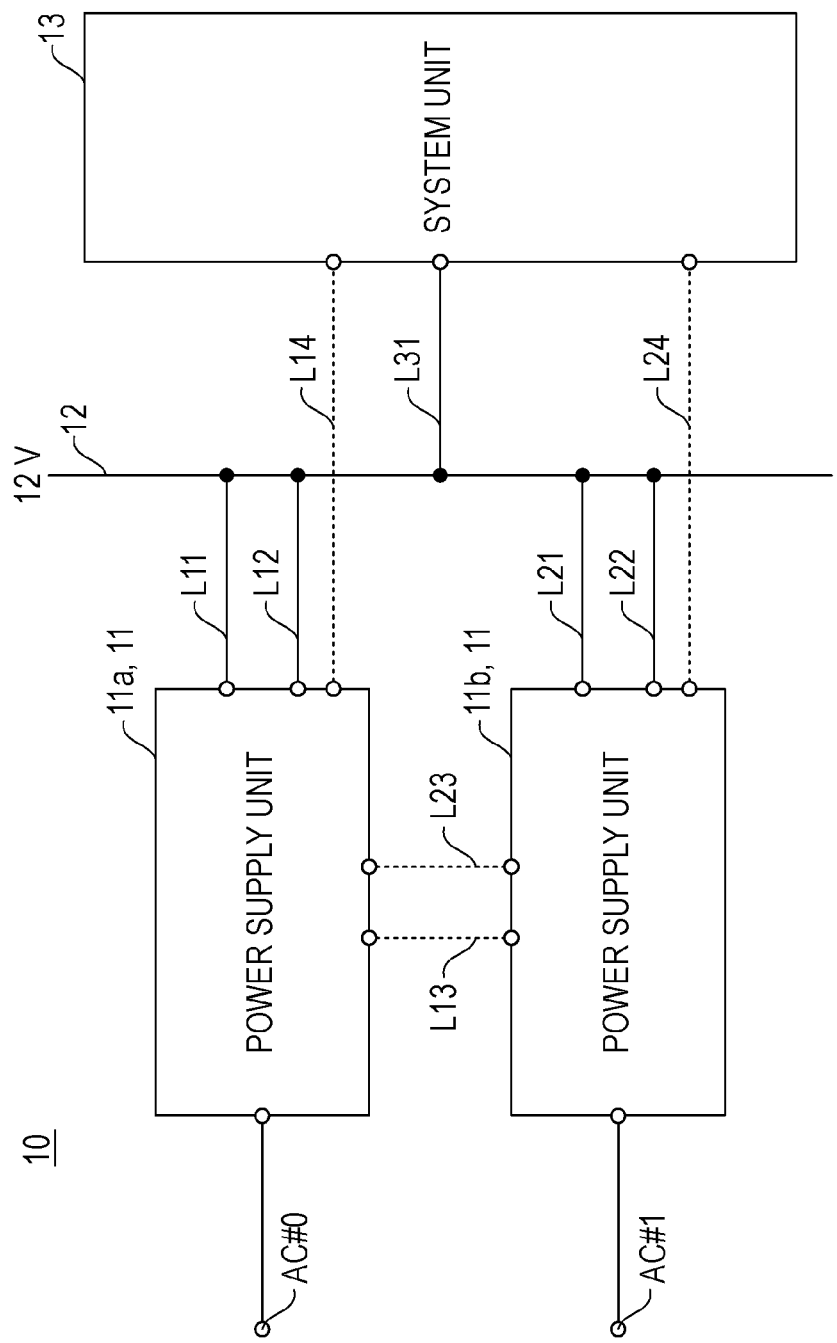
FIG. 2 is a diagram illustrating an example of a power supply system according to a second embodiment.

First, a power supply system according to a second embodiment is described using FIG. 2. FIG. 2 is a diagram illustrating an example of the power supply system according to the second embodiment.

A power supply system 10 includes two power supply units 11 (11a, 11b) configured to generate a DC power source of 12 V from an AC power source, and a system unit 13. Each power supply unit 11 is a power supply device, and outputs 12 V DC to a power line 12 in response to an input of 100 V AC. The power line 12 is a power supply line for the system unit 13, and the system unit 13 is a load device for the power supply units 11. Examples of the system unit 13 include a controller module (CM) unit and a disk enclosure (DE) unit in a storage system.

The power supply unit 11a inputs an AC power source AC#0, and the power supply unit 11b inputs an AC power source AC#1. The AC power source AC#0 and the AC power source AC#1 are different power sources. For example, the AC power source AC#0 is a power source supplied from a power company A whereas the AC power source AC#1 is a power source supplied from a power company B different from the power company A, or from an uninterruptible power system (UPS).

In addition, the power supply unit 11a and the power supply unit 11b form a redundant power supply configuration in the power supply system 10 and power requested by the system unit 13 may be supplied from any one of the power supply unit 11a and the power supply unit 11b. Note that, although the illustrated power supply configuration is a "1+1" configuration, the power supply configuration may be changed to an "n+n" configuration, having n power supply units 11 that input the AC power source AC#0 and n power supply units 11 that input the AC power source AC#1, depending on requested electric energy.

The power supply unit 11a outputs 12 V DC to the power line 12 via an electric power line L11, and inputs 12 V DC from the power line 12 via an electric power line L12. The power supply unit 11a charges a compensation capacitor to be described later with 12 V DC input via the electric power line L12.

The power supply unit 11b outputs 12 V DC to the power line 12 via an electric power line L21, and inputs 12 V DC from the power line 12 via an electric power line L22. The power supply unit 11b charges a compensation capacitor to be described later with 12 V DC input via the electric power line L22.

The power supply unit 11a outputs a limitation signal or a release signal via a signal line L13, and inputs a limitation signal or a release signal of the power supply unit 11b via a signal line L23. The power supply unit 11b outputs a limitation signal or a release signal via the signal line L23, and inputs a limitation signal or a release signal of the power supply unit 11a via the signal line L13. A limitation signal and a release signal will be described later.

The power supply unit 11a is configured to detect power failure if a predefined monitoring voltage (to be described later) falls below a threshold, and output a power failure notification signal to the system unit 13 via a signal line L14. The power supply unit 11b is configured to detect power failure if a predefined monitoring voltage (to be described later) falls below a threshold, and output a power failure notification signal to the system unit 13 via a signal line L24.

The system unit 13 inputs 12 V DC from the power line 12 via an electric power line L31, inputs the power failure notification signal from the power supply unit 11a via the signal line L14, and inputs the power failure notification signal from the power supply unit 11b via the signal line L24.

Figure 3:
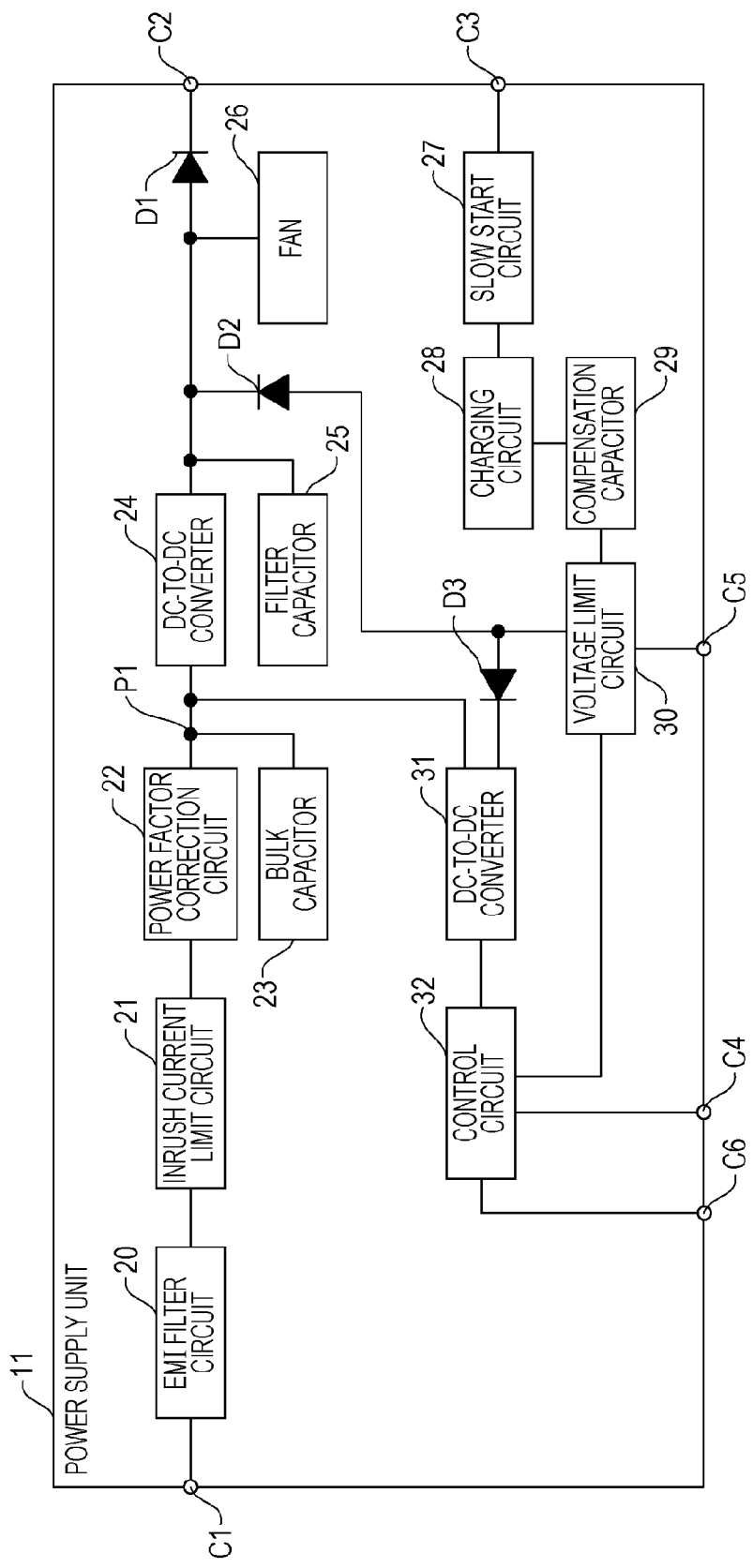
FIG. 3 is a diagram illustrating an example of a power supply unit according to the second embodiment.

Next, each power supply unit according to the second embodiment is described using FIG. 3. FIG. 3 is a diagram illustrating an example of the power supply unit according to the second embodiment.

Each power supply unit 11 includes an input terminal C1 and inputs an AC power source via the input terminal C1. The power supply unit 11 includes an electromagnetic interference (EMI) filter circuit 20 located downstream of the input terminal C1 and configured to remove noise included in the AC power source. The power supply unit 11 includes an inrush current limit circuit 21 located downstream of the EMI filter circuit 20 and configured to limit an inrush current. The power supply unit 11 includes a power factor correction circuit 22 located downstream of the inrush current limit circuit 21 and configured to rectify the AC power source and correct the power factor thereof. The power factor correction circuit 22 outputs a DC voltage of 380 V, for example.

The power supply unit 11 includes a bulk capacitor 23 located downstream of the power factor correction circuit 22 and configured to smooth a pulsating current. The power supply unit 11 includes a DC-to-DC converter 24 located downstream of the power factor correction circuit 22 and the bulk capacitor 23 and configured to convert an input voltage into an output voltage. For example, the DC-to-DC converter 24 inputs a DC voltage of 380 V and outputs a DC voltage of 12 V.

The power supply unit 11 includes a filter capacitor 25 located downstream of the DC-to-DC converter 24 and configured to remove noise included in the DC output from the DC-to-DC converter 24. The power supply unit 11 includes a diode D1 located downstream of the DC-to-DC converter 24 and the filter capacitor 25 and configured to check a backward flow from the power line 12 to the power supply unit 11. The power supply unit 11 includes an output terminal C2 downstream of the diode D1 and outputs 12 V DC via the output terminal C2. The power supply unit 11 also includes a fan 26 located downstream of the DC-to-DC converter 24 and the filter capacitor 25 as well as upstream of the diode D1 and configured to dissipate heat generated inside the power supply unit 11 to the outside to cool down the inside of the power supply unit 11. With the above configuration, the power supply unit 11 may generate a DC power source of a desired voltage from an input AC power source.

The power supply unit 11 includes an input terminal C3 and inputs a DC power source via the input terminal C3. The power supply unit 11 includes a slow start circuit (so-called a circuit for hot swap) 27 located downstream of the input terminal C3 and configured to limit the flow of an inrush current to the power supply unit 11. The power supply unit 11 includes a charging circuit 28 and a compensation capacitor (electric double-layer capacitor) 29 downstream of the slow start circuit 27. The charging circuit 28 is configured to charge the compensation capacitor 29. Note that any electricity storage device may be employed as the compensation capacitor 29, including a lithium-ion capacitor and a secondary battery.

The power supply unit 11 includes a voltage limit circuit 30 downstream of the compensation capacitor 29. The voltage limit circuit 30 is capable of limiting a discharge voltage from the compensation capacitor 29 to a voltage lower than an output voltage from the power supply unit 11 (11 V, for example). The voltage limit circuit 30 limits the discharge voltage from the compensation capacitor 29 in response to a limitation signal input from a control circuit 32 or a limitation signal input from another power supply unit 11 via an input terminal C5. In addition, the voltage limit circuit 30 releases the limit on the discharge voltage from the compensation capacitor 29 when receiving both a release signal input from the control circuit 32 and a release signal input from another power supply unit 11 via the input terminal C5.

The power supply unit 11 connects an output from the voltage limit circuit 30 to a part downstream of the DC-to-DC converter 24 via a diode D2 provided to check a backward flow. The power supply unit 11 uses the diode D2 to limit electric discharge from the compensation capacitor 29 in a normal state. Using the diode D1, the power supply unit 11 may also limit electric discharge from the compensation capacitor 29 when power failure occurs in the power supply unit 11 but power failure does not occur in any of other power supply units 11, and perform power compensation using the compensation capacitor 29 only when all of the AC power sources fail.

The power supply unit 11 includes a DC-to-DC converter 31 and the control circuit 32. The control circuit 32 operates in response to an input of an output from the DC-to-DC converter 31. The DC-to-DC converter 31 is configured to perform DC-to-DC conversion in response to an input of an output from the power factor correction circuit 22. For example, the DC-to-DC converter 31 inputs a DC voltage of 380 V and outputs a DC voltage of 5 V.

The DC-to-DC converter 31 is also configured to perform DC-to-DC conversion in response to an input of an output from the voltage limit circuit 30. For example, the DC-to-DC converter 31 inputs a DC voltage of 11 V and outputs a DC voltage of 5 V. Thereby, the control circuit 32 may be operated by power supplied from the compensation capacitor 29 via the voltage limit circuit 30 even in the case of power failure of the AC power source.

The control circuit 32 is configured to detect power failure of the AC power source. The control circuit 32 is configured to output a limitation signal if detecting no power failure of the AC power source and output a release signal if detecting the power failure of the AC power source. For example, the control circuit 32 may detect the power failure of the AC power source by monitoring a voltage at a node P1 of the bulk capacitor 23.

The control circuit 32 is connected to the voltage limit circuit 30 with a signal line, and thus may notify the voltage limit circuit 30 of a limitation signal or a release signal. The control circuit 32 may also notify other power supply units 11 of a limitation signal or a release signal via an input terminal C4. Further, the control circuit 32 is configured to output a power failure notification signal to the system unit 13 if detecting the power failure of the AC power source. Note that the power failure detection in the case of outputting a power failure notification (power outage notification) signal and the power failure detection in the case of outputting a release signal may or may not be the same. For example, in the case of outputting a release signal, power failure is detected when a voltage drops to a threshold Va at the node P1; in the case of outputting a power failure notification signal, power failure is detected when a voltage drops to a threshold Vb (<Va) at the node P1.

Figure 4:
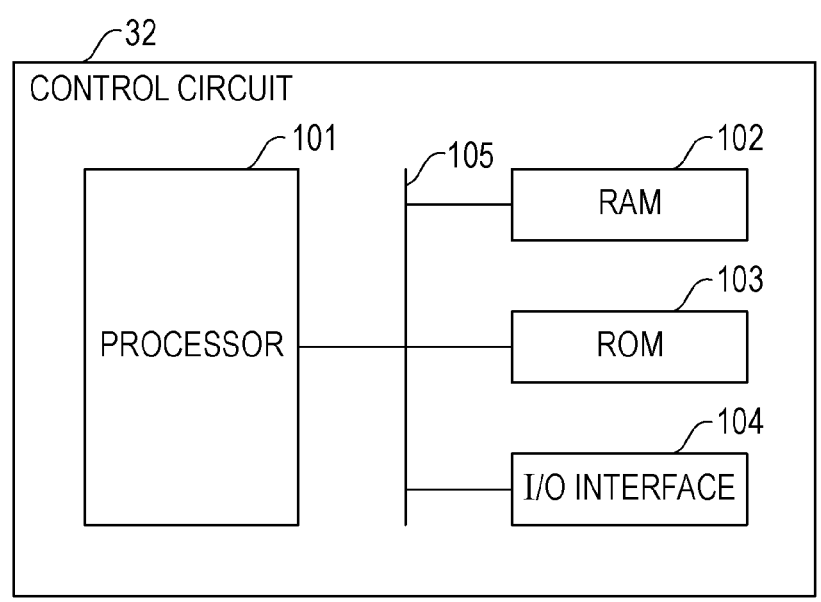
FIG. 4 is a diagram illustrating an example of a control circuit according to the second embodiment.

Next, a configuration of the control circuit 32 is described using FIG. 4. FIG. 4 is a diagram illustrating an example of the control circuit according to the second embodiment.

The control circuit 32 includes: a processor 101; a random access memory (RAM) 102; a read only memory (ROM) 103; an I/O interface 104; and a bus 105.

The processor 101 takes overall control of the control circuit 32. The RAM 102, the ROM 103, and the I/O interface 104 are connected to the processor 101 via the bus 105. The processor 101 may be a multi-core processor composed of two or more processors.

Examples of the processor 101 include a central processing unit (CPU), a micro processing unit (MPU), a digital signal processor (DSP), an application specific integrated circuit (ASIC), and a programmable logic device (PLD).

The RAM 102 is used as a primary storage of the control circuit 32. The RAM 102 temporarily stores therein at least a part of operating system (OS) programs and application programs for the processor 101 to execute. The RAM 102 also stores therein various data requested in order for processing of the processor 101. In addition, the RAM 102 serves as a cache memory of the processor 101.

The ROM 103 is used as a secondary storage of the control circuit 32. The ROM 103 stores therein OS programs, application programs, and various data. Note that a semiconductor storage such as a flash memory may be used as the secondary storage.

The I/O interface 104 is a communication interface used to connect peripheral devices to the control circuit 32. For example, the I/O interface 104 may output a limitation signal or a release signal to the voltage limit circuit 30 or other power supply units 11. In addition, a memory device and a memory reader/writer (not illustrated) may be connected the I/O interface 104. The memory device is a recording medium equipped with a communication function with the I/O interface 104. The memory reader/writer is a device to write data in or read data from a memory card. The memory card is a card type recording medium, for example.

A monitor (not illustrated) may also be connected to the I/O interface 104. In this case, the I/O interface 104 has a graphic processing function to display an image on a monitor screen according to a command from the processor 101.

A keyboard and a mouse (not illustrated) may also be connected to the I/O interface 104. In this case, the I/O interface 104 sends the processor 101 signals sent from the keyboard and the mouse. Note that the mouse is an example of a pointing device and other pointing devices may also be used. Examples of the other pointing devices include a touch panel, a tablet, a touchpad, and a trackball.

An optical drive device (not illustrated) may also be connected to the I/O interface 104. The optical drive device is configured to read data recorded in an optical disc by use of laser light or the like. The optical disc is a portable recording medium in which data is recorded so as to be capable of being read by reflection of light. Examples of the optical disc include a digital versatile disc (DVD), a DVD-RAM, a compact disc read only memory (CD-ROM), and a CD-recordable (R)/rewritable (RW).

The processing functions of the control circuit 32 of the second embodiment may be implemented by the hardware configuration described above. Note that the power supply control devices 2a, 3a of the first embodiment may also be implemented by the same hardware as the control circuit 32 illustrated in FIG. 4.

For example, the control circuit 32 implements the processing functions of the second embodiment by executing programs recorded in a computer-readable recording medium. Programs in which processing contents to be executed by the control circuit 32 are written may be recorded in various recording media. For example, the programs to be executed by the control circuit 32 may be stored in the ROM 103. The processor 101 loads at least a part of the programs in the ROM 103 into the RAM 102 to execute the programs. Alternatively, the programs to be executed by the control circuit 32 may be recorded in a portable recording medium such as an optical disc, a memory device, or a memory card. The programs stored in the portable recording medium become executable after being installed in the ROM 103 in response to control by the processor 101, for example. Instead, the processor 101 may directly read the programs from the portable recording medium to execute them.

Note that the control circuit 32 serves as a controller of the power supply unit 11. The control circuit 32 does not have to be built in the power supply unit 11 and may be provided outside the power supply unit 11. If the function as the controller is provided outside the power supply unit 11, an information processor connected to the power supply unit 11 serves as the controller.

Figure 5:
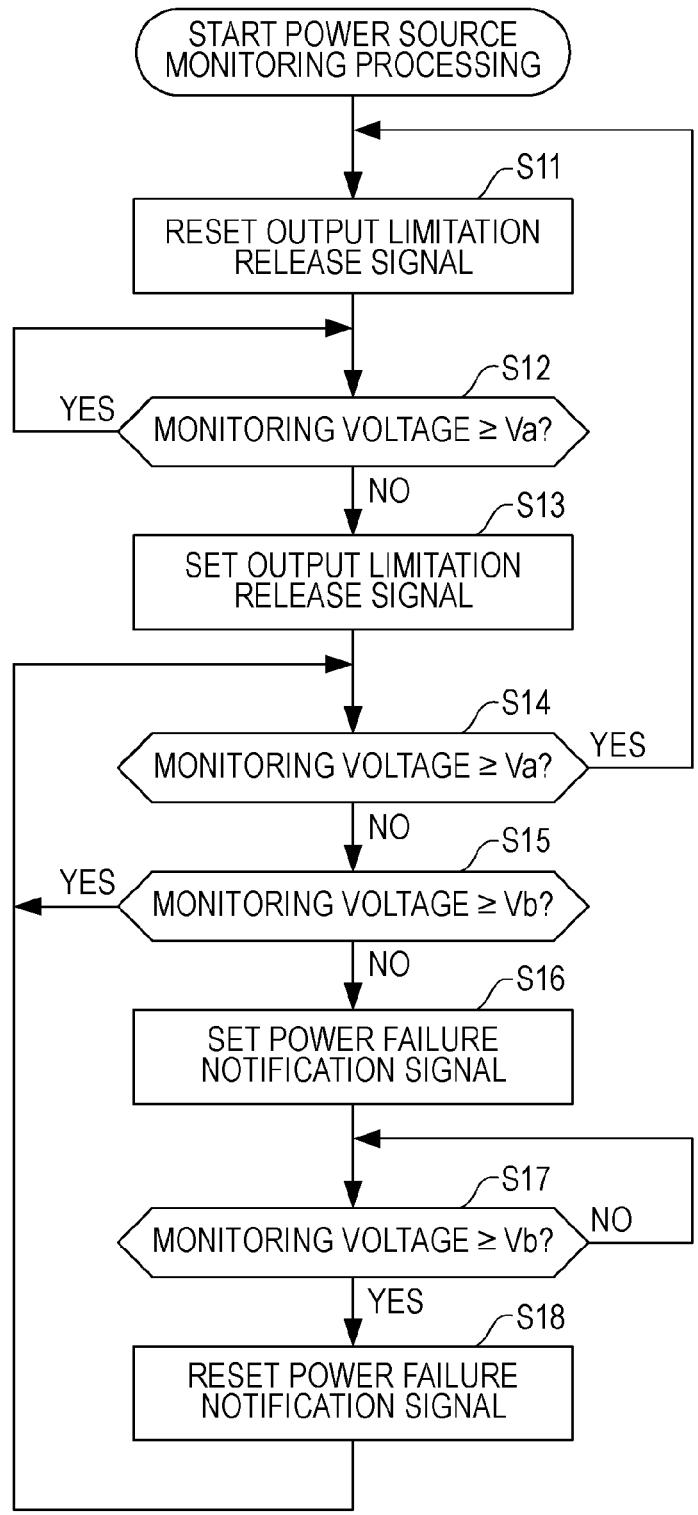
FIG. 5 is a diagram illustrating a flowchart of power source monitoring processing according to the second embodiment.

Next, power source monitoring processing is described using FIG. 5. FIG. 5 is a diagram illustrating a flowchart of the power source monitoring processing according to the second embodiment.

The power source monitoring processing is processing of monitoring a power source state and outputting various signals depending on the power source state. The power source monitoring processing is processing to be executed by the controller upon activation of the power supply unit 11.

[Step S11] The controller resets an output limitation release signal. The state where the output limitation release signal is reset indicates a state where the control circuit 32 outputs a limitation signal.

[Step S12] The controller judges whether or not a monitoring voltage is equal to or higher than a threshold voltage Va. The controller moves to Step S13 if the monitoring voltage is not equal to or higher than the threshold voltage Va, and keeps monitoring the monitoring voltage if the monitoring voltage is equal to or higher than the threshold voltage Va. The monitoring voltage represents a voltage measured at a position where the power failure of an AC power source may be detected, for example a voltage at the node P1.

[Step S13] The controller sets the output limitation release signal. The state where the output limitation release signal is set indicates a state where the control circuit 32 outputs a release signal.

[Step S14] The controller judges whether or not the monitoring voltage is equal to or higher than the threshold voltage Va. The controller moves to Step S15 if the monitoring voltage is not equal to or higher than the threshold voltage Va, and moves to Step S11 if the monitoring voltage is equal to or higher than the threshold voltage Va.

[Step S15] The controller judges whether or not the monitoring voltage is equal to or higher than a threshold voltage Vb. The controller moves to Step S16 if the monitoring voltage is not equal to or higher than the threshold voltage Vb, and moves to Step S14 if the monitoring voltage is equal to or higher than the threshold voltage Vb. Note that the threshold voltage Vb is lower than the threshold voltage Va.

[Step S16] The controller sets a power outage notification signal. The state where the power outage notification signal is set indicates a state where the control circuit 32 outputs a power failure notification signal.

[Step S17] The controller judges whether or not the monitoring voltage is equal to or higher than the threshold voltage Vb. The controller moves to Step S18 if the monitoring voltage is equal to or higher than the threshold voltage Vb, and keeps monitoring the monitoring voltage if the monitoring voltage is not equal to or higher than the threshold voltage Vb.

[Step S18] The controller resets the power outage notification signal. The state where the power outage notification signal is reset indicates a state where the control circuit 32 outputs no power failure notification signal.

Thereby, the power supply unit 11 may output a limitation signal if the monitoring voltage is equal to or higher than the threshold voltage Va and output a release signal if the monitoring voltage is lower than the threshold voltage Va. Besides, the power supply unit 11 may output a power failure notification signal if the monitoring voltage is lower than the threshold voltage Vb.

Figure 6:
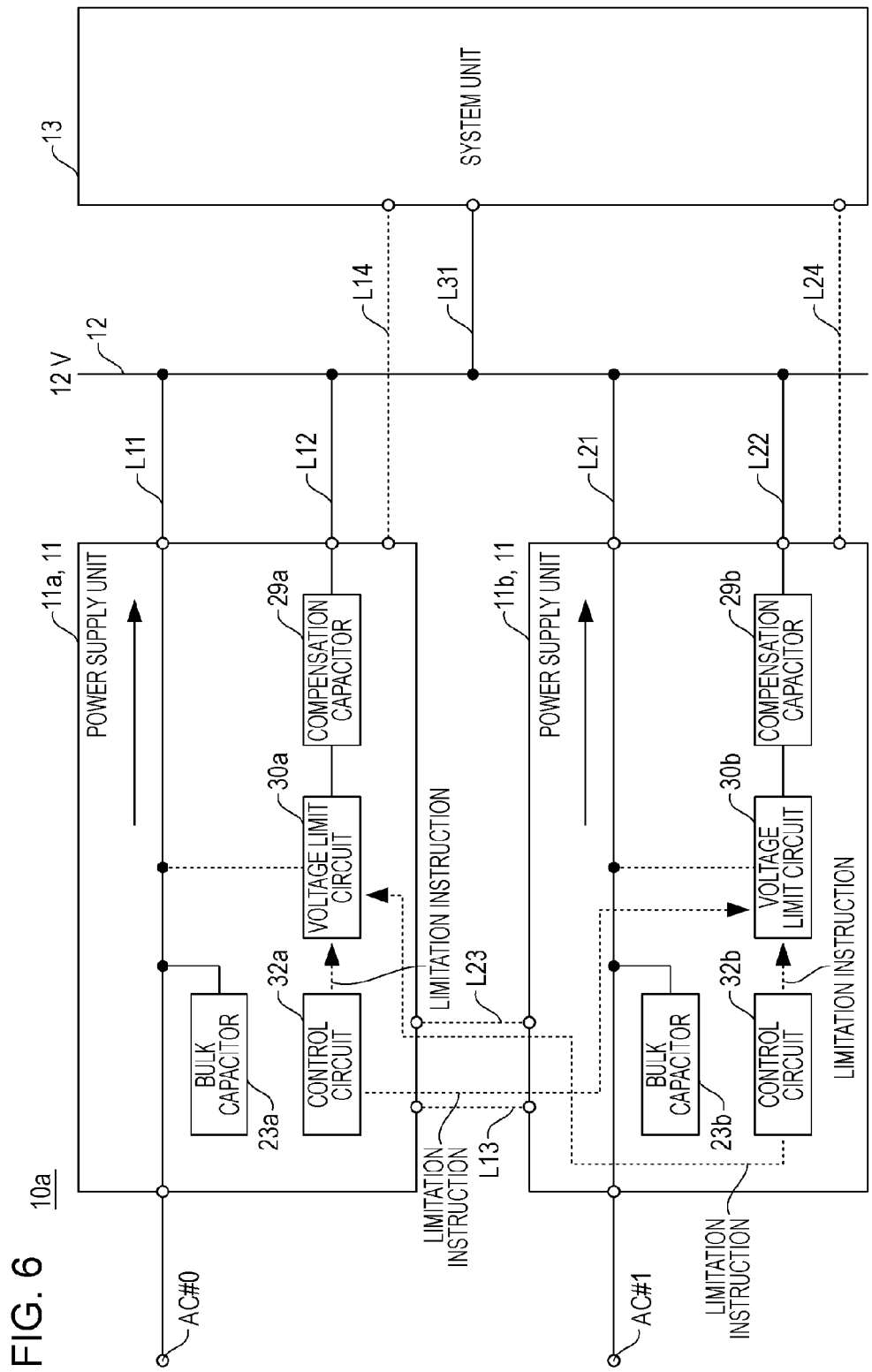
FIG. 6 is a diagram illustrating an example of an operating state of each power supply unit in a normal state of the power supply system according to the second embodiment.
Figure 7:
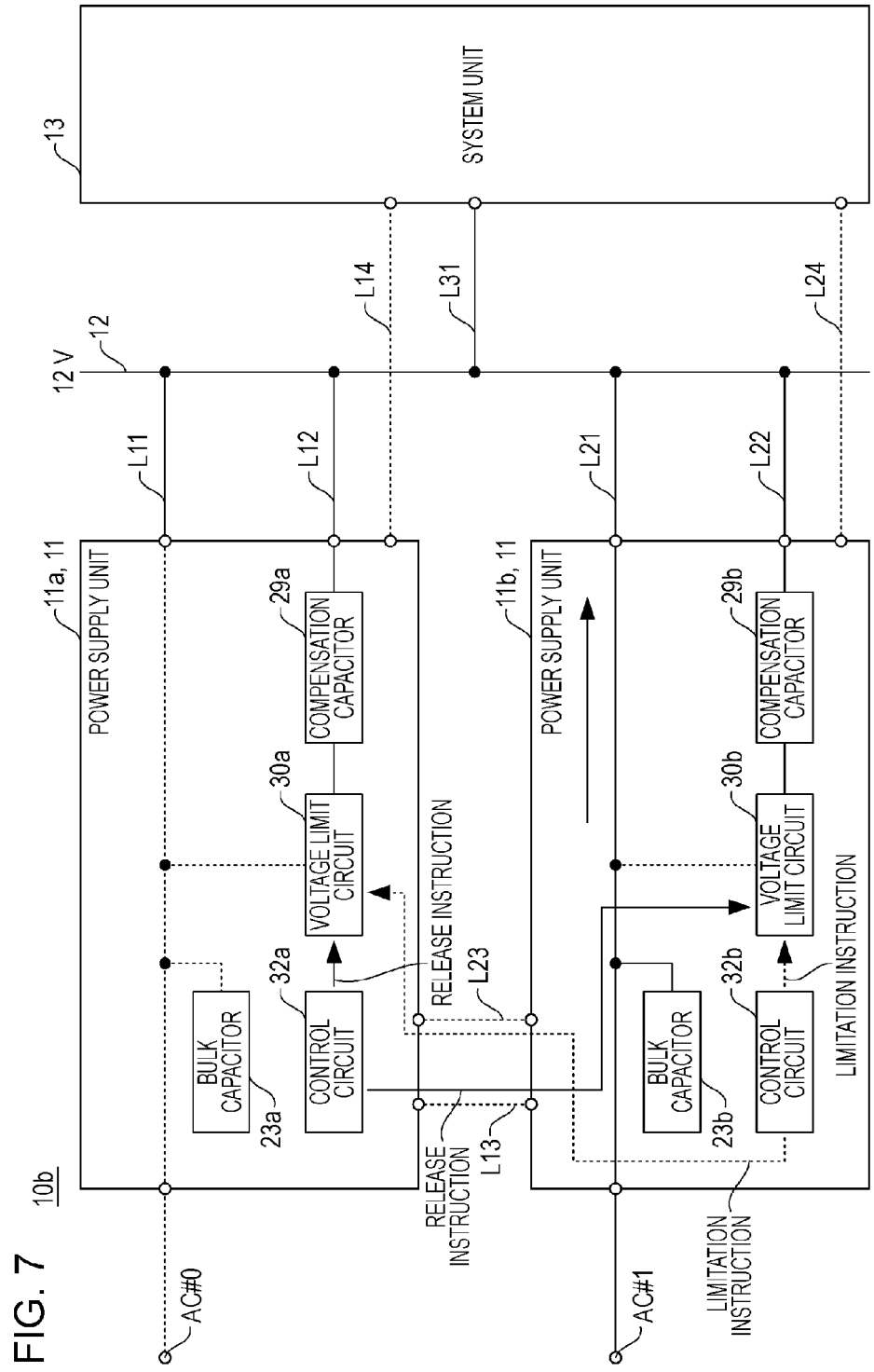
FIG. 7 is a diagram illustrating an example of an operating state of each power supply unit in a state of power failure of an AC#0 in the power supply system according to the second embodiment.
Figure 8:
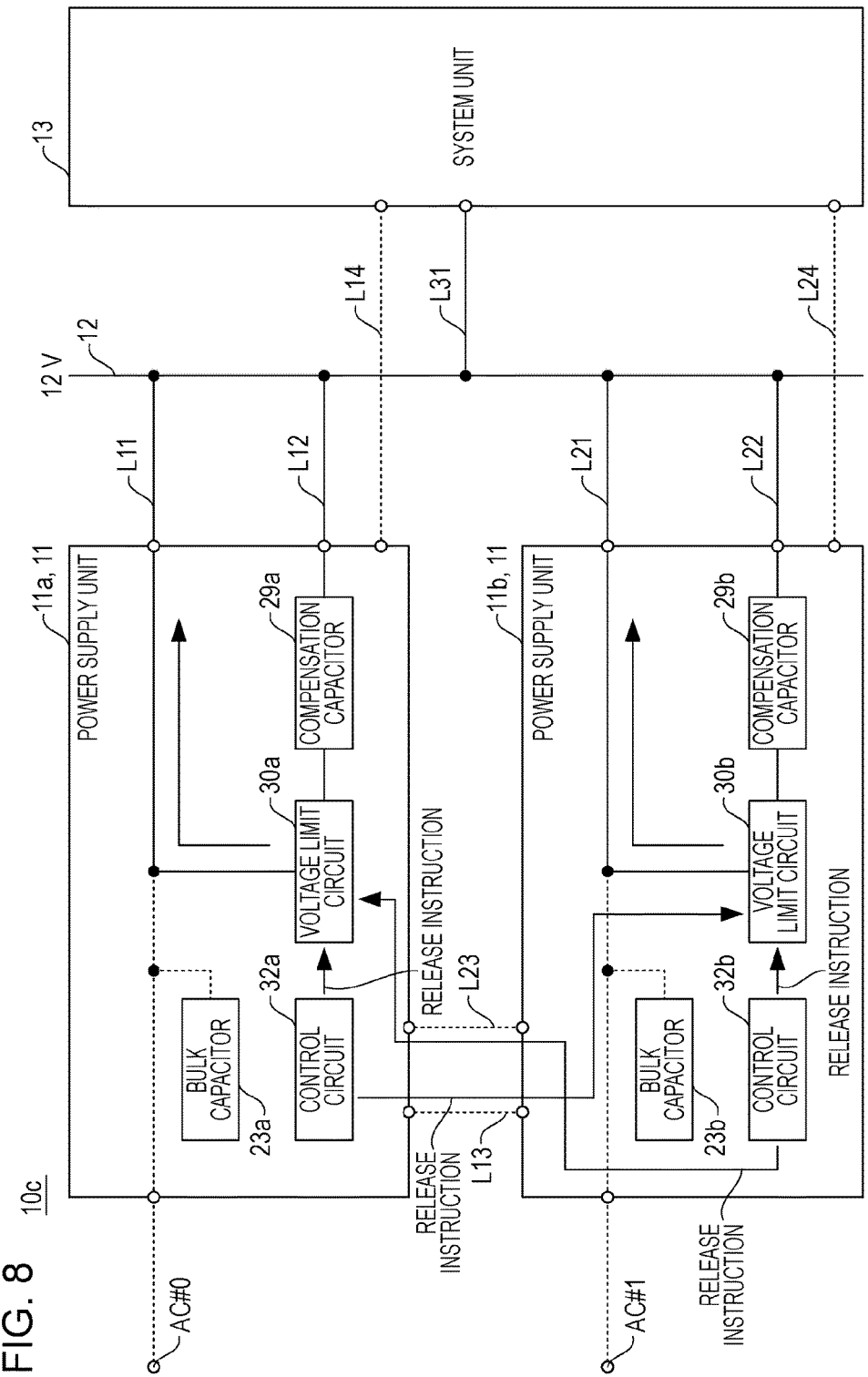
FIG. 8 is a diagram illustrating an example of an operating state of each power supply unit in a state of power failure of an AC#0 and an AC#1 in the power supply system according to the second embodiment.

Next, an operation of the power supply unit 11 in the case of detection of power failure is described using FIGS. 6 to 8. First, an operating state of each of the power supply units 11*a*, 11*b* in a normal state of the power supply system 10 is described using FIG. 6. FIG. 6 is a diagram illustrating an example of the operating state of each power supply unit in the normal state of the power supply system according to the second embodiment. Note that, in each of the power supply units 11*a*, 11*b* illustrated in FIG. 6, a part of the configuration thereof is not illustrated for the sake of simplifying the description (the same goes for FIGS. 7 and 8).

A power supply system 10*a* is in a state where an AC power source is input into each of the power supply units 11*a* and 11*b*. The power supply unit 11*a* inputs the AC power source AC#0 and outputs 12 V DC, whereas the power supply unit 11*b* inputs the AC power source AC#1 and outputs 12 V DC to the power line 12. The system unit 13 is in a state of receiving power supply from the power supply unit 11*a* and the power supply unit 11*b*.

Each of the compensation capacitors 29*a*, 29*b* is in a state of being charged by 12 V DC input from the power line 12. The control circuit 32*a* is in a state of monitoring a voltage of the bulk capacitor 23*a* and giving a limitation instruction to each of the voltage limit circuit 30*a* and the power supply unit 11*b* since the monitoring voltage is equal to or higher than the threshold Va. The control circuit 32*a* gives the limitation instruction to each of the voltage limit circuit 30*a* and the power supply unit 11*b* by outputting a limitation signal. Note that the power supply unit 11*a* is in a state of not outputting a power failure notification signal to the system unit 13 since the monitoring voltage is equal to or higher than the threshold Vb.

The control circuit 32*b* is in a state of monitoring a voltage of the bulk capacitor 23*b* and giving a limitation instruction to each of the voltage limit circuit 30*b* and the power supply unit 11*a* since the monitoring voltage is equal to or higher than the threshold Va. The control circuit 32*b* gives the limitation instruction to each of the voltage limit circuit 30*b* and the power supply unit 11*a* by outputting a limitation signal. Note that the power supply unit 11*b* is in a state of not outputting a power failure notification signal to the system unit 13 since the monitoring voltage is equal to or higher than the threshold Vb.

The voltage limit circuit 30*a* is in a state of receiving the limitation instruction from the control circuit 32*a* and the power supply unit 11*b*. The voltage limit circuit 30*a* limits an output voltage from the compensation capacitor 29*a*. The compensation capacitor 29*a* holds electric charges accumulated due to the limitation on its output voltage by the voltage limit circuit 30*a*.

The voltage limit circuit 30*b* is in a state of receiving the limitation instruction from the control circuit 32*b* and the power supply unit 11*a*. The voltage limit circuit 30*b* limits an output voltage from the compensation capacitor 29*b*. The compensation capacitor 29*b* holds electric charges accumulated due to the limitation on its output voltage by the voltage limit circuit 30*b*.

Next, an operating state of each of the power supply units 11*a*, 11*b* in a state of power failure of the power supply unit 11*a* is described using FIG. 7. FIG. 7 is a diagram illustrating an example of the operating state of each power supply unit in a state of power failure of the AC#0 in the power supply system according to the second embodiment.

A power supply system 10*b* is in a state where an AC power source is input into the power supply unit 11*b* and an AC power source of the power supply unit 11*a* fails. The power supply unit 11*a* stops an output of 12 V DC. The power supply unit 11*b* outputs 12 V DC to the power line 12 in response to the input of the AC power source AC#1. The system unit 13 is in a state of receiving a power supply from the power supply unit 11*b*.

Each of the compensation capacitors 29*a*, 29*b* is in a state of being charged by 12 V DC input from the power line 12. The control circuit 32*a* is in a state of monitoring a voltage of the bulk capacitor 23*a* and giving a release instruction to each of the voltage limit circuit 30*a* and the power supply unit 11*b* since the monitoring voltage is lower than the threshold Va. The control circuit 32*a* gives the release instruction to each of the voltage limit circuit 30*a* and the power supply unit 11*b* by outputting a release signal. Note that the power supply unit 11*a* is in a state of not outputting a power failure notification signal to the system unit 13 if the monitoring voltage is equal to or higher than the threshold Vb, but outputting the power failure notification signal to the system unit 13 if the monitoring voltage is lower than the threshold Vb.

The control circuit 32*b* is in a state of monitoring a voltage of the bulk capacitor 23*b*, and giving a limitation instruction to each of the voltage limit circuit 30*b* and the power supply unit 11*a* since the monitoring voltage is equal to or higher than the threshold Va. Note that the power supply unit 11*b* is in a state of not outputting a power failure notification signal to the system unit 13 since the monitoring voltage is equal to or higher than the threshold Vb.

The voltage limit circuit 30*a* is in a state of receiving a release instruction from the control circuit 32*a* and receiving a limitation instruction from the power supply unit 11*b*. The voltage limit circuit 30*a* keeps limiting an output voltage from the compensation capacitor 29*a* because it has not received release instructions from both the control circuit 32*a* and the power supply unit 11*b*. The compensation capacitor 29*a* holds electric charges accumulated due to the limitation on its output voltage by the voltage limit circuit 30*a*.

The voltage limit circuit 30*b* is in a state of receiving a limitation instruction from the control circuit 32*b* and receiving a release instruction from the power supply unit 11*a*. The voltage limit circuit 30*b* keeps limiting an output voltage from the compensation capacitor 29*b* because it has not received release instructions from both the control circuit 32*b* and the power supply unit 11*a*. The compensation capacitor 29b holds electric charges accumulated due to the limitation on its output voltage by the voltage limit circuit 30b.

Next, an operating state of each of the power supply units 11a, 11b in a state of power failure of the power supply units 11a, 11b is described using FIG. 8. FIG. 8 is a diagram illustrating an example of the operating state of each power supply unit in a state of power failure of the AC#0 and the AC#1 in the power supply system according to the second embodiment.

A power supply system 10c is in a state where an AC power source of the power supply unit 11a fails and an AC power source of the power supply unit 11b fails. The power supply unit 11a and the power supply unit 11b each stop an output of 12 V DC.

The control circuit 32a is in a state of monitoring a voltage of the bulk capacitor 23a, and giving a release instruction to each of the voltage limit circuit 30a and the power supply unit 11b since the monitoring voltage is lower than the threshold Va. Note that the power supply unit 11a is in a state of not outputting a power failure notification signal to the system unit 13 if the monitoring voltage is equal to or higher than the threshold Vb, and outputting the power failure notification signal to the system unit 13 if the monitoring voltage is lower than the threshold Vb.

The control circuit 32b is in a state of monitoring a voltage of the bulk capacitor 23b, and giving a release instruction to each of the voltage limit circuit 30b and the power supply unit 11a since the monitoring voltage is lower than the threshold Va. Note that the power supply unit 11b is in a state of not outputting a power failure notification signal to the system unit 13 if the monitoring voltage is equal to or higher than the threshold Vb, and outputting the power failure notification signal to the system unit 13 if the monitoring voltage is lower than the threshold Vb.

The voltage control circuit 30a is in a state of receiving release instructions from both the control circuit 32a and the power supply unit 11b. The voltage limit circuit 30a releases the limitation on the output voltage of the compensation capacitor 29a. The compensation capacitor 29a is released from the limitation by the voltage limit circuit 30a and discharges the accumulated electric charges. The power supply unit 11a thereby performs power compensation of 12 V DC to the power line 12.

The voltage control circuit 30b is in a state of receiving release instructions from both the control circuit 32b and the power supply unit 11a. The voltage limit circuit 30b releases the limitation on the output voltage of the compensation capacitor 29b. The compensation capacitor 29b is released from the limitation by the voltage limit circuit 30b and discharges the accumulated electric charges. The power supply unit 11b thereby performs power compensation of 12 V DC to the power line 12.

In this way, the power supply unit 11a and the power supply unit 11b perform power compensation with their compensation capacitors 29 at the same timing. This enables power compensation for a longer period than a period for which each of the power supply units 11a and 11b may perform power compensation independently. In addition, since the power supply unit 11a and the power supply unit 11b may perform long-time power compensation in cooperation with each other, each compensation capacitor 29 may be downsized. Further, a space for housing the compensation capacitor 29 in each power supply unit 11 may be reduced along with the downsizing of the compensation capacitor 29, so that the power supply unit 11 may also be downsized.

Figure 9:
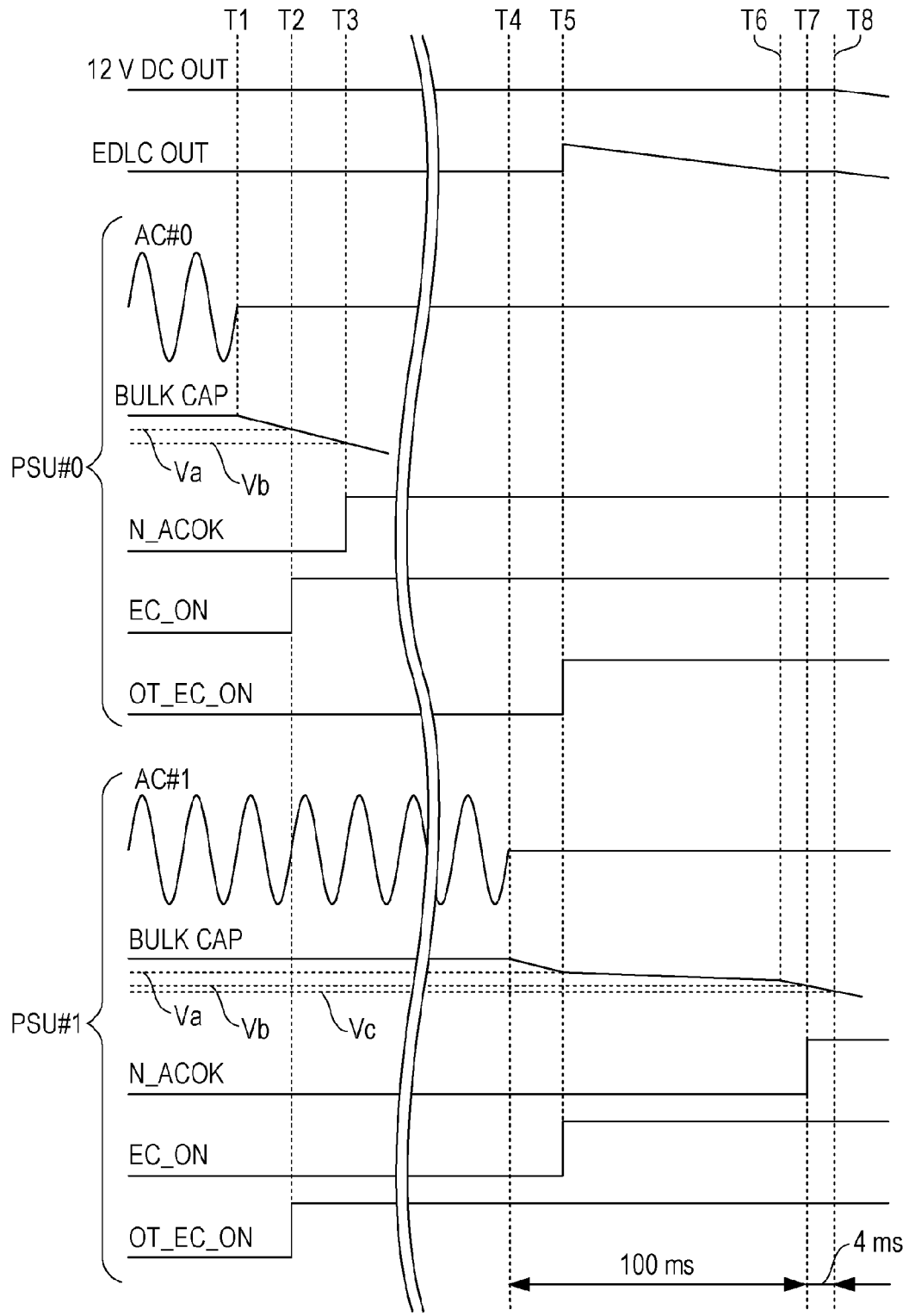
FIG. 9 is a diagram illustrating an example of a timing chart of the power supply system according to the second embodiment.

Next, various signal outputs of the power supply system 10 at the time of power failure are described using FIG. 9. FIG. 9 is a diagram illustrating an example of a timing chart of the power supply system according to the second embodiment.

Note that "12 V DC OUT" indicates a voltage of the power line 12 and "EDLC OUT" indicates an output voltage of the compensation capacitor 29. "Power supply unit (PSU) #0" indicates the power supply unit 11a and "PSU#1" indicates the power supply unit 11b. "AC#0" indicates an AC power source to be input into "PSU#0 " and "AC#1" indicates an AC power source to be input into "PSU#1". "Bulk Cap" indicates a voltage of the bulk capacitor 23. "N_ACOK" indicates a power failure notification signal, "EC_ON" indicates a limitation signal or a release signal for its power supply unit, and "OT_EC_ON" indicates a limitation signal or a release signal for the other unit. In other words, "EC_ON" of "PSU#0" indicates a limitation signal or a release signal for "PSU#0", and "OT_EC_ON" of "PSU#0" indicates a limitation signal or a release signal for "PSU#1". Each of "EC_ON" and "OT_EC_ON" indicates a limitation signal when it is at a Lo level, and indicates a release signal when it is at a Hi level.

Hereinbelow, variations in the various signal outputs are described in chronological order.

[Timing T1] Power failure occurs in the AC power source "AC#0" input into the power supply unit 11a. Thus, the voltage of the bulk capacitor 23a is gradually decreased.

[Timing T2] Upon detecting that the voltage of the bulk capacitor 23a has been decreased below the threshold Va, the controller of the power supply unit 11a changes the limitation signal having been outputted to each of the voltage limit circuit 30a and the power supply unit 11b to a release signal.

[Timing T3] The controller of the power supply unit 11a outputs a power failure notification signal upon detecting that the voltage of the bulk capacitor 23a has been decreased below the threshold Vb.

In this state, the system unit 13 is receiving power supply from the power supply unit 11b. The compensation capacitor 29a holds electric charges accumulated due to the limitation on its output voltage by the voltage limit circuit 30a. The compensation capacitor 29b holds electric charges accumulated due to the limitation on its output voltage by the voltage limit circuit 30b.

[Timing T4] Power failure occurs in the AC power source "AC#1" input into the power supply unit 11b. Thus, the voltage of the bulk capacitor 23b is gradually decreased.

[Timing T5] Upon detecting that the voltage of the bulk capacitor 23b has been decreased below the threshold Va, the controller of the power supply unit 11b changes the limitation signal having been outputted to each of the voltage limit circuit 30b and the power supply unit 11a to a release signal. In response to receipt of the release signals from both the power supply units 11a, 11b, the voltage limit circuit 30a releases the limitation on the output voltage of the compensation capacitor 29a. In addition, in response to receipt of the release signals from both the power supply units 11a, 11b, the voltage limit circuit 30b releases the limitation on the output voltage of the compensation capacitor 29b. Thereby, each of the compensation capacitors 29 (29a, 29b) is released from the limitation on its output voltage and serves as a compensation power source for the power line 12. The voltage of the bulk capacitor 23a is maintained by the electric discharge from the compensation capacitor 29.

[Timing T6] As the compensation capacitors 29 run out of accumulated electric charges, the voltage of the bulk capacitor 23a is further decreased.

[Timing T7] The controller of the power supply unit 11a outputs a power failure notification signal upon detecting that the voltage of the bulk capacitor 23a has been decreased below the threshold Vb.

In this state, the system unit 13 performs a save operation such as a backup operation upon receipt of the power failure notification signals from both the power supply units 11a, 11b.

[Timing T8] The voltage of the bulk capacitor 23a is decreased to Vc. The system unit 13 performs the save operation in a period of about 4 ms left until the voltage of the bulk capacitor 23a is decreased from Vb to Vc.

The power supply system 10 sets an interval from the timing T4 to the timing T7 at about 100 ms. This may make the system unit 13 unlikely to perform the save operation in the case of instantaneous voltage interruption or instantaneous voltage drop for a period shorter than 100 ms.

As described above, since the power supply unit 11a and the power supply unit 11b perform power compensation using their compensation capacitors 29 at the same timing, it is possible to perform power compensation for a longer period than a period for which each of the power supply units 11a and 11b may perform power compensation independently. In addition, since the power supply unit 11a and the power supply unit 11b may perform long-time power compensation in cooperation with each other, each compensation capacitor 29 may be downsized. Further, a space for housing the compensation capacitor 29 in each power supply unit 11 may be reduced along with the downsizing of the compensation capacitor 29, so that the power supply unit 11 may also be downsized.

Note that the processing functions described above may be implemented by a computer. Programs provided in this case are ones in which the processing contents of the functions to be included in the power supply control devices 2a, 3a, the power supply units 11, and the control circuits 32 are written. The computer implements the processing functions on itself by executing the programs. The programs in which the processing contents are written may be recorded in a computer-readable recording medium. Examples of such a computer-readable recording medium include a magnetic-storage device, an optical disc, a magneto-optical recording medium, and a semiconductor memory. Examples of the magnetic-storage device include a hard disc drive (HDD), a flexible disc (FD), and a magnetic tape. Examples of the optical disc include a DVD, a DVD-RAM, and a CD-ROM/RW. An example of the magneto-optical recording medium includes a magneto-optical disk (MO).

In the case of distributing the programs, for example, a portable recording medium, such as a DVD or a CD-ROM, having the programs recorded therein is sold. Alternatively, it is also possible to store the programs in a storage device of a server computer and transfer the programs from the server computer to another computer via a network.

For example, the computer to execute the programs stores, into its storage device, the programs recorded in the portable recording medium or transferred from the server computer. Then, the computer reads the programs from its storage device and executes processing according to the programs. Note that the computer may also read the programs directly from the portable recording medium and execute processing according to the programs, or alternatively may also receive the programs sequentially transferred from the server computer connected via the network and execute processing according to the received programs at every time of such transfer.

Alternatively, at least a part of the above processing functions may be implemented by an electronic circuit such as a DSP, an ASIC, or a PLD.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention.

Although the embodiments of the present invention have been described in detail, it should be understood that the various changes, substitutions, and alterations could be made hereto without departing from the spirit and scope of the invention.

What is claimed is:

1. A power supply control device configured to control a first power supply device that includes a first compensation device configured to perform power compensation at a time of power failure of the first power supply device, the power supply control device comprising:
    a memory; and
    a processor coupled to the memory and configured to:
    limit the power compensation of the first compensation device in a normal state,
    generate and output, when power failure occurs in the first power supply device, a first signal indicating power failure of the first power supply device to a second power supply device provided redundantly to the first power supply device, the second power supply device including a second compensation device configured to perform power compensation at a time of power failure of the second power supply device, and
    release the limitation on the power compensation of the first compensation device after detecting power failure of the first power supply device and receiving a second signal indicating power failure of the second power supply device, wherein the power failure of the first power supply device is independent of the power failure of the second power supply device.

2. The power supply control device according to claim 1, wherein the processor Is further configured to:
    limit the power compensation by inputting, into a limitation circuit configured to limit the power compensation, a limitation signal that limits the power compensation, and
    release the limitation on the power compensation by inputting, into the limitation circuit, a release signal that releases the limitation on the power compensation.

3. The power supply control device according to claim 2, wherein the processor is further configured to release the limitation on the power compensation in response to both the release signal in the first power supply device and a release signal from a power supply control device configured to control the second power supply device.

4. The power supply control device according to claim 2, wherein the first compensation device is connected to an output unit of the first power supply device via a diode, and
    the limitation circuit limits the power compensation of the first compensation device by restricting an output voltage from the first compensation device to a voltage lower than an output voltage from the first power supply device.

5. The power supply control device according to claim 1, wherein the processor monitors a direct-current voltage generated by the first power supply device, and detects the power failure of the first power supply device when the direct-current voltage is decreased below a first threshold.

6. The power supply control device according to claim 5, wherein the processor notifies a load device of an anomaly if the direct-current voltage is decreased below a second threshold lower than the first threshold.

7. A power supply device comprising:
- a compensation device configured to perform power compensation at a time of power failure;
- a limitation circuit configured to limit the power compensation;
- a memory; and
- a processor coupled to the memory and configured to:
- limit the power compensation in a normal state by inputting, into the limitation circuit, a limitation signal that limits the power compensation,
- generate and output, when power failure occurs in the power supply device, a first signal indicating power failure of the power supply device to another power supply device provided redundantly to the power supply device, the another power supply device including another compensation device configured to perform power compensation at a time of power failure of the another power supply device, and
- release the limitation on the power compensation by inputting, into the limitation circuit, a release signal that releases the limitation on the power compensation, when detecting power failure of the power supply device and receiving a second signal indicating power failure of the another power supply device, wherein the power failure of the first power supply device is independent of the power failure of the another power supply device.

8. A power supply control system, comprising:
- a first power supply device; and
- a second power supply device provided redundantly to the first power supply device, each of the first power supply device and the second power supply device including:
- a compensation device; and
- a power supply control device, each power supply control device including:
- a memory; and
- a processor coupled to the memory and configured to:
- limit the power compensation of the respective compensation device in a normal state; and
- release the limitation on the power compensation of the respective compensation device after receiving both a first release signal indicating power failure of the first power supply device and a second release signal indicating power failure of the second power supply device.

* * * * *